United States Patent [19]

Parks et al.

[11] Patent Number: 5,708,121
[45] Date of Patent: Jan. 13, 1998

[54] STORAGE STABLE MELAMINE-MODIFIED PHENOLIC RESOLE RESINS USING AN ALKALINE CONDENSATION AND POLYHYDROXYL COMPOUND STABILIZATION

[75] Inventors: Claude Phillip Parks, Olympia; Kurt Forrest Anderson, Tacoma, both of Wash.

[73] Assignee: Georgia-Pacific Resins, Inc., Atlanta, Ga.

[21] Appl. No.: 813,579

[22] Filed: Mar. 7, 1997

Related U.S. Application Data

[63] Continuation of Ser. No. 388,662, Feb. 22, 1995, abandoned.

[51] Int. Cl.$^6$ .............................. C08G 8/04; C08G 14/04; C08G 14/10
[52] U.S. Cl. .................. 528/163; 528/165; 528/232; 528/254
[58] Field of Search ................. 528/163, 165, 528/232, 254

[56] References Cited

U.S. PATENT DOCUMENTS

| | | | |
|---|---|---|---|
| 2,315,400 | 3/1943 | D'Alelio | 528/129 |
| 2,859,186 | 11/1958 | Boresch et al. | 528/129 |
| 3,666,694 | 5/1972 | Ingram, II | 528/129 |
| 3,862,060 | 1/1975 | Anderson et al. | 528/129 |
| 3,956,204 | 5/1976 | Higginbottom | 528/129 |
| 4,028,367 | 6/1977 | Higginbottom | 528/129 |
| 4,785,073 | 11/1988 | Farkas et al. | 528/163 |
| 4,960,826 | 10/1990 | Walisser | 524/494 |
| 5,296,584 | 3/1994 | Walisser | 528/163 |
| 5,322,915 | 6/1994 | Weiser et al. | 528/163 |

FOREIGN PATENT DOCUMENTS

| | | |
|---|---|---|
| 48-12857 | 2/1973 | Japan. |
| 54-18860 | 2/1979 | Japan. |

*Primary Examiner*—Duc Truong
*Attorney, Agent, or Firm*—Banner & Witcoff, Ltd.

[57] ABSTRACT

This invention relates to an emulsifiable melamine-modified phenolic resole resin composition useful as a binder for glass fibers. The invention is more particularly directed to the process of preparing the resole resin composition using an alkaline condensation in the presence of a polyhydroxyl compound.

27 Claims, No Drawings

STORAGE STABLE MELAMINE-MODIFIED PHENOLIC RESOLE RESINS USING AN ALKALINE CONDENSATION AND POLYHYDROXYL COMPOUND STABILIZATION

This application is a file wrapper continuation of application Ser. No. 08/388,662, filed on Feb. 22, 1995, now abandoned.

This invention relates to an emulsifiable melamine-modified phenolic resole resin composition, useful for example in preparing a binder for glass fibers. The invention is more particularly directed to the process of preparing the resole resin composition using alkaline condensation in the presence of a polyhydroxyl compound.

BACKGROUND OF THE INVENTION

Typically, a mixture of phenol and formaldehyde is reacted, with a suitable alkaline catalyst, to obtain a resole resin. The reaction can be conducted in one or more steps. The resin can be further treated and then shaped or applied as a coating, as desired, and then cured.

U.S. Pat. No. 4,785,073 describes adding a glycol or glycol derivative to a melamine-phenol-formaldehyde resole whereby the glycol functions as an external plasticizer and a reactive plasticizing diluent by partially condensing with methylolated species during use to produce ether side chains. The glycol is introduced into the composition "at a late stage in the production of the melamine-formaldehyde resole."

U.S. Pat. No. 5,371,140 describes an emulsifiable phenolic resole resin prepared by reacting a phenol in the presence of a basic catalyst having a mono-valent metal cation, neutralizing the basic catalyst, and adding an aldehyde scavenger.

Certain melamine-modified resole resins have been desired because of the better storage stability of their emulsions. Such melamine-modified phenolic resole resin emulsions can be prepared, for example, by co-reacting phenol, formaldehyde and melamine or by adding melamine to a partially methylolated phenol prior to any condensation reaction between the methylolated species.

The formaldehyde/phenol/melamine reactions have been carried out under acidic or alkaline conditions or a combination of such conditions. Typically, after the reaction is complete, a neutralization agent is added, which can be followed by the addition of a protective colloid to form an emulsion.

When melamine reacts with formaldehyde under alkaline conditions, two species of melamine can be formed which can contribute to storage stability problems. These are trimethylolated and hexamethylolated melamine. These compounds crystallize at cold temperatures and form a sediment in resins that are stored. Thus, there is a need for an effective process to produce a melamine-modified phenolic resole resin which is stabilize against premature precipitation of methylolated melamine species.

SUMMARY OF THE INVENTION

The present invention provides an emulsifiable storage stable melamine-modified phenolic resole resin composition useful in preparing a binder for glass fibers. Such glass fiber binders are used for glass insulation, such as for pipes, and are preferred because they have little odor.

The present invention is directed to adding a polyhydroxy compound during melamine modification of a resole resin which occurs under alkaline reaction conditions. Crystallization (e.g. precipitation) of methylolated melamine species is inhibited by preparing the resin in the presence of the polyhydroxy compound.

Polyhydroxy compounds previously have been used in the preparation of melamine-formaldehyde resins, produced by reacting formaldehyde and melamine. It is thought that such compounds stabilize the resin against premature precipitation of methylolated melamine species. Polyhydroxy compounds, however, have not been used in preparing more complex melamine-modified phenolic resole resins.

In accordance with the process of the present invention, an initial phenolic methylolation at a formaldehyde to phenol (F/P) mole ratio within the range of about 1:1 to 6:1 is carried out in an aqueous reaction media under alkaline reaction conditions. Then, sufficient melamine is added to the methylolated phenol to provide a mole ratio of the residual formaldehyde to added melamine (F/M) within the range of about 1:1 to 3:1. A polyhydroxyl compound, such as sucrose, is also added with the melamine. The mixture is further reacted under the prevailing alkaline conditions. The aqueous alkaline reaction conditions promote methylolation of melamine by formaldehyde, condensation between methylolated species and ether formation between the polyhydroxyl compound and methylolated species. Upon resin neutralization and the addition of a protective colloid, such as casein, an emulsifiable composition is produced.

Additional advantages of the invention will be set forth in part in the description which follows, and in part will be apparent from the description, or may be learned by the practice of the invention. The advantages of the invention may be realized and obtained by means of the elements and combinations particularly pointed out in the claims.

It is to be understood that both the foregoing general description and the following detailed description are exemplary and explanatory only and are not restrictive of the present invention as claimed.

DETAILED DESCRIPTION OF THE INVENTION

The present invention is directed to a method of preparing a storage stable melamine-modified phenolic resole resin that is emulsifiable.

In accordance with the invention, an alkaline catalyzed resole resin composition first is prepared by combining formaldehyde and phenol at a formaldehyde to phenol mole ratio between about 1:1 to 6:1, preferably between about 2:1 to 6:1, in an aqueous reaction media in the presence of an effective catalytic amount of a basic catalyst. The pH during the reaction is between about 8 and 10, preferably between about 8.5 and 9.5.

The phenol component of the resole resin includes any phenol typically used in preparing phenolic resole resins, which are not substituted at either the two ortho positions or at one ortho and the para position, such unsubstituted positions being necessary for the desired polymerization reaction to occur. Phenols substituted in these positions may be used in lesser quantities (e.g., up to about 30 weight % of the phenol component) as it is known in the art to control molecular weight by a chain termination reaction. Any one, all, or none of the remaining carbon atoms of the phenol ring can be substituted in a conventional fashion. The nature of these substituents can vary widely, and it is only necessary that the substituent not interfere in the polymerization of the aldehyde with the phenol at the ortho and/or para positions thereof. Furthermore, at least a portion of the phenol component must include a phenol not blocked at the ortho and para positions so that the resin is thermosettable. Preferably, at least 10% by weight of the phenol component should include such tri-functional phenol and usually the phenol component consists essentially entirely of such tri-functional phenol.

Substituted phenols which optionally can be employed in the formation of the phenolic resins include alkyl substituted phenols, aryl substituted phenols, cycloalkyl substituted phenols, alkenyl-substituted phenols, alkoxy substituted phenols, aryloxy substituted phenols, and halogen-substituted phenols, the foregoing substituents possibly containing from 1 to 26, and usually from 1 to 9, carbon atoms.

Specific examples of suitable phenols for preparing the resole resin composition of the present invention include: hydroxy benzene (phenol), o-cresol, m-cresol, p-cresol, 3,5-xylenol, 3,4-xylenol, 3,4,5-trimethylphenol, 3-ethylphenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, p-phenoxy phenol, naphthol, anthranol and substituted derivatives thereof. Ordinary phenol (hydroxy benzene) normally is preferred for most applications.

Included among the phenolic reactants which may be used are those known as the "cresylic acids" and these often comprise heterogeneous mixtures having two reacting hydrogen positions on each of them; that is, compounds unsubstituted in the ortho- and para-positions, and hence, yield relatively unreactive resins. These compounds may include the following: 3,5-xylenol, m-cresol, 3,4-xylenol, 2,5-xylenol, 2,3-xylenol, phenol, p-cresol, o-cresol, 2,4-xylenol, and 2,6-xylenol. Cresylic acids or tar acids may include phenol and its homologs which include cresols, xylenols, trimethyl phenols, ethyl phenols, and higher boiling materials such as dihydroxy phenols, polycyclic phenols and the like. They are often obtained by a low-temperature trimerization of coal, lignite, and the like, or a conventional high-temperature coke oven tar, or the liquid product of petroleum cracking both thermo and catalytic, shell oil, coal hydrogenation products, and the like.

Polyhydroxyaromatic reactants, such as resorcinol, may also be used, in relatively low amounts. Also useful in this invention are mixtures of aniline and phenol to react with an aldehyde or ketone to produce a resole. Additionally, sodium lignosulfonate may also be substituted for a portion of the phenol.

The formaldehyde can be used alone or in combination with any of the wide variety of aldehydes or their equivalents heretofore employed in the formation of phenolic resole resins including, for example, acetaldehyde, propionaldehyde, butyraldehyde, ethylbutyraldehyde, heptaldehyde, 2-ethylhexanal, crotonaldehyde, furfuraldehyde, and benzaldehyde. In general, the aldehydes employed have the formula R'CHO wherein R' is a hydrogen or hydrocarbon radical generally of 1-8 carbon atoms. It will be appreciated that some aldehydes, e.g., acetaldehyde and butyraldehyde, improve toughness of the resole resin at the expense of lowering the HDT thereof (heat distortion temperatures, as determined by American Society for Testing and Materials ASTM D-648). Also it is contemplated that difunctional aldehydes can be used to prepare the phenolic resin, and could advantageously be used to introduce cross-links into the cured resin. Ordinary formaldehyde is preferred for most applications. Formaldehyde can be supplied in any one of its commonly available forms including formalin solutions and paraformaldehyde.

The alkaline catalyst promotes the reaction of the formaldehyde with phenol to form an alkaline resole resin. The alkaline catalyst should be monovalent and may be any of the inorganic and organic alkaline catalysts known to be useful in preparing phenol-formaldehyde resole resins can be employed. The alkaline catalyst is present in an amount effective to catalyze the reaction between the phenol and formaldehyde. The catalyst to phenol mole ratio is generally between about 0.04:1 to 1.5:1, preferably about 0.6:1 to 0.8:1. Typical catalysts include alkali metal hydroxides, such as NaOH, LiOH, KOH, or mixtures thereof, preferably NaOH. Other catalysts include alkali metal carbonates such as sodium carbonate and potassium carbonate, alkaline earth hydroxides such as magnesium hydroxide, calcium hydroxide and barium hydroxide, aqueous ammonia and amines.

The reaction temperature for the initial reaction between the phenol component and formaldehyde generally is maintained between about 55° C. and reflux although higher temperatures can be used. For example, a suitable temperature is between 55° and 95° C., preferably between 60° and 70° C. and most preferably 65° C. The extent of the first reaction is determined by the degree of methylolation of the phenol and is measured by assaying the % free phenol. This test can be performed using gas chromatography methods known to those skilled in the art. Preferably the reaction is continued until the % free phenol is between 2.5 and 0.3%, which is dependent upon the initial mole ratio of the formaldehyde and phenol. For instance, lower mole ratio prepared resoles have a higher free phenol content because there is less formaldehyde per parts of phenol to react with the phenol in the mixture. Generally, the reaction is sufficiently complete when the majority of the phenol and formaldehyde have reacted and the rate of methylolation is decreasing and the condensation reaction is increasing. Reacting the resole beyond this point may cause instability in a completed melamine-modified resole. At the end of the first reaction, the resole usually has about a 50:1 water dilutability.

Typically the reaction time is between 125 and 250 minutes, more preferably 150 and 200 minutes. At the end of the first reaction, the composition is cooled to between about 40° and 20° C. and preferably about 30° C.

In the next step, the excess (unreacted) free formaldehyde is reacted with melamine at a mole ratio of the excess formaldehyde to added melamine (F/M) between about 3.0:1 to 1.0:1, preferably about 3.0:1 to 1.5:1. It is contemplated that the melamine may be partly substituted by other aminotriazines such as guanamine or benzoguanamine. This reaction also is conducted in an aqueous reaction media under alkaline reaction conditions. The pH is between about 8 and 10, preferably about 8.5 and 9.5. In this step, however, the reaction is conducted in the presence of a polyhydroxy compound.

The polyhydroxy compound is added in sufficient amounts to prevent premature crystallization of methylolated melamine species. The amount of polyhydroxyl compound expressed as the mole ratio of the polyhydroxyl compound to melamine is about 0.05:1 to 0.5:1 and more preferably 0.1:1 to 0.3:1.

In addition to sugars, other polyhydroxyl compounds can be used for stabilization, including glycols, polyglycols (such as trethyleneglycol) alcoholamines, alcoholamides etc. Low volatility polyhydroxy compounds are preferred such as sucrose, sorbitol, or triethanolamine, or mixtures of these with other alcohol amines such as mono- or diethanolamine. A preferred polyhydroxy compound is sorbitol.

The reaction temperature is raised to and maintained between about 70° and 90° C. for the melamine methylolation/condensation. Then the melamine-modified phenolic resin is cooled to between about 25° and 50° C., more preferably between about 25° and 35° C.

The alkaline reaction condition promotes both methylolation and condensation of the methylolated melamine, and further allows formation of ether linkages between hydroxyl groups of the polyhydroxy compound and methylolated species. The combination of both alkaline methylolation/condensation and ether formation reduces the formation and crystallization of trimethylolated and hexamethylolated melamine species.

Other additives may be used along with the polyhydroxy compounds, such as compounds useful for buffering including aliphatic amines such as methylamine, dimethylamine, and triethanolamine. Triethanolamine, in addition to being polyhydroxyl, works as a pH buffer for the system. It and other amines can be added in a small amount to help buffer the reaction pH in the 8–10 range. EDTA can be added for complexing multivalent cations that could cause agglomeration or precipitation of anionic species in the resin. Ammonia can also be added to ensure that the free formaldehyde is low enough to prevent the precipitation of casein when it is added.

The alkaline melamine-modified phenolic resole resin produced in the previous step is then neutralized, preferably to a pH of about 6.5 to 8.5, more preferably to a pH of about 8.0 by adding an acid. Acids suitable for neutralizing the resin include sulfamic acid, phosphoric acid, sulfuric acid, hydrochloric acid, oxalic acid, acetic acid, maleic acid, and the like, and their ammonium salts. Other suitable inorganic and organic acids will be recognized by those skilled in the art. Preferably the acid is 100% sulfamic acid. However, the type of acid and its concentration is well within the skill of the art to provide a phenolic resin with the desired characteristics. The final pH will also be influenced by on the type of emulsifying system or protective colloid that is used.

A suitable protective colloid solution can be formed from an aqueous solution of a proteinaceous compound. The preferred solutions are formed from proteinaceous compounds which are soluble in aqueous media at a pH from about 6 to about 8.5. Such solulizable proteinaceous compounds are well known to those of ordinary skill in the art. In general, they are amphoteric but typically are used in the present invention at a pH from about 7 to about 10. The most commonly used proteinaceous materials of this type are casein and soya proteins; common molecular weights ranging from 100,000 to 400,000. Preferred protective colloid solutions include casein, guar gum, gum arabic, lecithin, soya protein or mixtures thereof.

The protective colloid solution functions as an emulsifier. Though not as preferred, other emulsifiers include Karaya gum, ammonium alginate, polyvinyl alcohol, polyvinyl acetate and carboxylated methylcellulose, or mixtures thereof. Such emulsifiers may be suitable when the emulsified composition is prepared on site just prior to use, for example by using an in-line mixer and thereafter promptly utilizing the emulsified composition. Other emulsifier systems which may be conveniently used are combinations of gum arabic and polysaccharides consisting essentially of mannose and galactose units or consisting essentially of D-mannuronic and L-guluronic acid units when the radio of the gum arabic to the other polysaccharides is about 0.5:1 to about 20:1.

The protective colloid solution generally may be prepared in the presence of alkali metal hydroxides, alkali metal carbonates, ammonium hydroxide and organic amines, e.g., urea, dicyandiamide, triethylamine, and the like, as well as mixtures of the foregoing. The solution of proteinaceous compound contains between 10 and 30% by weight of the proteinaceous compound. The amount of proteinaceous compound which is added to the resole resin for preparing the emulsifiable composition is the range of about 0.5 to about 20 parts proteinaceous compound per 100 parts of resole resin solids, i.e., about 0.25% to about 10% by weight of the proteinaceous compound based on the combined weight of the proteinaceous compound and the resole resin solids. It my be advantageous to add urea or dicyandiamide to the aqueous solution of the proteinaceous compound as a viscosity depressant. Urea or dicyandiamide also acts to reduce the free aldehyde, e.g., formaldehyde, when the aqueous solution is added to the resole resin. Although not required, if used, the amount of urea or dicyandiamide effective for these purposes is in the range of about 1 to about 100 parts by weight of urea per 100 parts of proteinaceous compound, i.e., about 0.5% to about 50% by weight urea based on the combined weight of the urea and the proteinaceous compound.

The quantity of proteinaceous compound necessary for imparting stability to an aqueous, water dilutable phenolic resin emulsion is determined to some extent by the aldehyde-phenol mole ratio during the reaction phase and the final molecular weight of the resole component. In general, a high molecular weight resin requires a higher concentration of proteinaceous compound. The preferred quantity of proteinaceous compound is between 0.1 and 5 weight % of total resin solids. Below 0.1 weight percent, the phenolic resin system often loses its water emulsifiability; while a level of the proteinaceous compound above about 5 weight % of the phenolic resin system generally is not cost justifiable under present economic circumstances.

Casein is preferably utilized as the proteinaceous compound in preparing the protective colloid solution and is present in the composition from about 1 to about 5% by weight based on the total weight of the composition (including water.) The end point pH of the resole is controlled to about 7.5 to about 8.5 to ensure proper performance of the casein, for example, by using an acid, e.g., sulfamic acid to neutralize the resin. The casein solution can be prepared by dissolving urea in water and then dispersing casein in the urea solution to form a slurry. The urea helps reduce the viscosity of the casein solution when the casein dissolves. After some 30 to 60 minutes, aqueous sodium hydroxide, and optionally ammonium hydroxide, is added to enhance solubilization. Mixing is continued until a solution is formed. The solution is then added to the aqueous resole. As earlier noted, ammonium hydroxide and urea also have the added value of being aldehyde scavengers. To avoid reaction and precipitation of aldehyde, the free aldehyde is scavenged to about 1% by weight or less, based on the total composition, before the addition of the casein. Such is readily satisfied by the requirement that the composition of the present invention have a free aldehyde content of less than 1% by weight. A casein solution can also be prepared without urea, particularly if a less concentrated solution is needed. Such solutions are well within the skill of the art.

During the process of preparing the melamine-modified resole resins of the present invention, a variety of other modifiers can be added into the resole resin in order to improve toughness and other cured resin properties. These modifiers include, for example, chain terminating phenols, glycols, with or without halogen substitution for additional fire retardancy, polyester polyols, alkyl phenols, hydroxy-containing acrylates, and the like and mixtures thereof. The proportion of such modifiers incorporated into the resole resin typically ranges from 5 to 35 weight percent (based on the phenol component.)

Other modifiers such as fire retardants, lubricants, defoamers, plasticizers, softening agents, pigments and fillers can be added to the resole resin composition. Reactive modifiers can be added to the resole resin after it has been formulated such as di- and higher polyols, e.g., di- or polyhydric phenols, resorcinol, phloroglucinol, and the like. Finally, modifiers to achieve special effects in particular applications may be appropriate, e.g., polyvinyl butyrals, or epoxies for better impact strength in composites.

The emulsifiable resins of the present invention preferably have a free phenol content below about 1.0%, preferably below about 0.5%, by weight and a free aldehyde content below about 1.5%, preferably below about 0.75%, by weight.

The emulsifiable resins of the present invention may be easily converted to resin-in-water emulsions by simple addition of water with sufficient agitation to permit effective blending of the water. This can normally be accomplished with the use of conventional propeller, blade or turbine agitators. Preferred dilution ratios are at least about 1:1, more preferably 2:1, although any dilution ratio to provide the desired emulsion is contemplated.

A preferred embodiment provides a resinous liquid that emulsifies with the addition of water at a dilution of approximately 1:1 with water, and has a free phenol content of about 1% and a free aldehyde content of about 0.5%.

The emulsifiable compositions of the present invention and the emulsified counterpart have a long storage life, particularly if stored at low temperatures. For example, a stable emulsion formed on dilution of 50:1 generally will not precipitate in a storage container for about 18 days at 25° C., about 27 days at 15° C. and about 44 days at 5° C. Generally, the lower the storage temperature, the longer the emulsion will remain stable. The duration of the stable emulsion will depend on the dilution ratio and the amount and type of resin components used in accordance with the present invention.

The storage stable melamine-modified phenolic resin of the present invention is particularly useful as a binder for glass fibers although it is also useful as an adhesive for other inorganic or organic fibers, particulates, cellulose, paper products, mineral wool, wood substrates, wood chips, metal, cotton, hemp, polyester and acrylic fibers. In addition, this resin system could be used in conjunction with other binder systems as an extender and/or co-reactant to produce a binder having increased physical, economic or environmental advantage. Examples of this are used with latex emulsions, urea-formaldehyde resins, melamine resins, lignins, silicones, silanes, etc.

EXAMPLES

The invention will be further described by reference to the following examples. These examples should not be construed in any way as limiting the invention to anything less than that which is disclosed or which could have been obvious to anyone skilled in the art.

Example 1

A resole resin was prepared at a 2.65:1 mole ratio of formaldehyde to phenol resin using NaOH as the alkaline catalyst supplied at a NaOH/phenol mole ratio of 0.075:1. Phenol and formaldehyde, as an aqueous formation solution, were added to a kettle and heated to 55° C. The NaOH then was added over 20 minutes while maintaining the temperature at 55° C. The kettle contents were then heated to 63° C. over 20 minutes. The resole reactants were held at this temperature for 195 minutes to obtain methylolation of the phenol. After the hold time expired, the resin was cooled to 30° C. and 0.0024 moles of triethanolamine, 3.74 moles of water, 0.041 moles of sucrose, and 0.33 moles of melamine all were added. The resin was then reheated to 80° C. over 20 minutes and held until the resin exhibited a water dilutability of 4:1. The water dilutability of a resin solution is the volume of deionized water which can be added per unit volume of resin solution at a given temperature without producing any permanent perturbation, i.e., haze, clouding or precipitation. Once the resin achieved the 4:1 water dilutability, the resin was cooled to 40° C. and the resin was neutralized to a pH of 8.0 with sulfamic acid. Next the resin was cooled to 25° C. and a casein solution was added at 6.1 by weight of the resin, where the casein solution preparation had component ratios (in parts by weigh) of 83.85 water: 15 casein: 0.15 NaOH: 1 ammonium hydroxide.

Example 2

A resole resin was prepared at a 5.0:1 mole ratio of formaldehyde to phenol using NaOH as the alkaline catalyst as a NaOH/phenol mole ratio of 0.125:1. Phenol and formaldehyde, as an aqueous formation solution were added to a kettle and heated to 55° C. The NaOH was then added over 35 minutes while maintaining the temperature at 55° C. The kettle contents were then heated to 65° C. over 20 minutes. The resole reactants were held at this temperature for 165 minutes to obtain methylolation of the phenol. After the hold time expired, the resin was cooled to 30° C. and 0.00025 moles EDTA, 0.023 moles of triethanolamine, 7.29 moles of $H_2O$, 0.05 moles of sorbitol, 0.43 moles of melamine and 1.71 moles of urea were added. The resin was then reheated to 80° C. over 20 minutes and held until the resin achieved a 5:1 water dilutability. Then the resin was cooled to 40° C. and the resin was neutralized to a pH of 8.0 with sulfamic acid. Next 0.12 moles of ammonia was added and the solution was held 20 minutes. Then a casein solution was added at a 5.6 by weight of the resin, where the casein solution preparation had component ratios (in parts by weight) of 68.9 water: 20 casein: 10 urea: 1 ammonium hydroxide: 0.1 NaOH.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A method of preparing a storage stable emulsifiable melamine-modified phenolic resole resin comprising:

(a) preparing an alkaline resole resin by reacting formaldehyde and a phenol at a formaldehyde to phenol mole ratio between about 1:1 to 6:1 at a pH between about 8 and 10 in the presence of an effective catalytic amount of a monovalent basic catalyst; followed by (b) adding a polyhydroxy compound and reacting formaldehyde remaining unreacted after the formaldehyde and phenol reaction, with melamine at a pH between about 8 and 10, at an unreacted formaldehyde to melamine mole ratio between about 3:1 to 1:1, wherein the polyhydroxy compound is added in an amount sufficient to prevent premature crystallization of methylolated melamine species;

(c) neutralizing the melamine modified, phenolic resole resin to a pH between about 6.5 and 8.5; and (d) adding a protective colloid to the neutralized melamine modified phenolic resole resin.

2. The method of claim 1 wherein the catalyst is selected from the group consisting of NaOH, LiOH, KOH, and mixtures thereof.

3. The method of claim 2 wherein the catalyst is NaOH.

4. The method of claim 1 wherein the polyhydroxy compound is selected from the group consisting of sucrose, sorbitol and triethanolamine.

5. The method of claim 4 wherein the polyhydroxy compound is sorbitol.

6. The method of claim 1 wherein the melamine modified phenolic resole resin is neutralized with sulfamic acid.

7. The method of claim 1 wherein the protective colloid is selected from the group consisting of casein, guar gum, gum arabic, lecithin, soya protein, and mixtures thereof.

8. The method of claim 7 wherein the protective colloid is casein.

9. The method of claim 1 wherein the formaldehyde to phenol ratio is between about 2:1 to 6:1.

10. The method of claim 1 wherein the basic catalyst to phenol mole ratio is between about 0.6:1 to 0.8:1.

11. The method of claim 1 wherein the unreacted formaldehyde to melamine ratio is between about 3.0:1 to 1.5:1.

12. The method of claim 1 wherein the reaction temperature during step (a) is about 55° to 95° C.

13. The method of claim 1, wherein the pH during step (a) is between about 8.5 and 9.5 and the pH during step (b) is between about 8.5 and 9.5.

14. The method of claim 1, wherein the melamine modified phenolic resole resin is neutralized to a pH between about 7 and 8.

15. The method of claim 1 wherein the phenol is phenol ($C_6H_5OH$) or a substituted phenol.

16. A storage stable emulsifiable melamine-modified phenolic resole resin comprising:

a melamine-modified alkaline resole resin prepared by first reacting formaldehyde and a phenol at a formaldehyde to phenol mole ratio between about 1:1 to 6:1 at a pH of between about 8 and 10 in the presence of an effective catalytic amount of a monovalent basic catalyst; then adding a polyhydroxy compound and reacting formaldehyde remaining unreacted after the formaldehyde and phenol reaction with melamine at a pH between about 8 and 10, at an unreacted formaldehyde to melamine mole ratio between about 3:1 to 1:1, wherein the polyhydroxy compound is added in an amount sufficient to prevent premature crystallization of methylolated melamine species; adding a neutralizing agent to the melamine-modified phenolic resole resin to a pH between about 6.5 and 8.5; and adding a protective colloid to the neutralized melamine modified phenolic resole resin.

17. The resole resin of claim 16 wherein the catalyst is selected from the group consisting of NaOH, LiOH, KOH, and mixtures thereof.

18. The resole resin of claim 17 wherein the catalyst is NaOH.

19. The resole resin of claim 16 wherein the polyhydroxy compound is selected from the group consisting of sucrose, sorbitol, and triethanolamine.

20. The resole resin of claim 19 wherein the polyhydroxy compound is sorbitol.

21. The resole resin of claim 16 wherein the neutralizing agent is sulfamic acid.

22. The resole resin of claim 16 wherein the protective colloid is selected from the group consisting of casein, guar gum, gum arabic, lecithin, soya protein, and mixtures thereof.

23. The resole resin of claim 22 wherein the protective colloid is casein.

24. The resole resin of claim 16 wherein the formaldehyde to phenol ratio is between about 2:1 to 6:1.

25. The resole resin claim 16 wherein the basic catalyst to phenol mole ratio is between about 0.6:1 to 0.8:1.

26. The resole resin of claim 16 wherein the unreacted formaldehyde to melamine ratio is between about 3.0:1 to 1.5:1.

27. The resole resin of claim 16 wherein the phenol is phenol ($C_6H_5OH$) or a substituted phenol.

* * * * *